United States Patent [19]
Massara

[11] Patent Number: 6,036,266
[45] Date of Patent: *Mar. 14, 2000

[54] VEHICLE SEAT ASSEMBLY INCORPORATING A ONE-PIECE SHELL AS SEAT BACK AND LOWER SEAT SUPPORT

[75] Inventor: Andrew J. Massara, Vargön, Sweden

[73] Assignee: Lear Corporation, Southfield, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/787,680

[22] Filed: Jan. 23, 1997

[51] Int. Cl.⁷ ..................................................... A47C 1/024
[52] U.S. Cl. .................... 297/328; 297/321; 297/DIG. 8; 297/326
[58] Field of Search .............................. 297/284.11, 321, 297/326, 328, DIG. 8, 313, 216.19, 452.14, 452.15

[56] References Cited

U.S. PATENT DOCUMENTS

| | | | |
|---|---|---|---|
| 3,261,037 | 7/1966 | Cermark et al. | 297/DIG. 8 X |
| 3,263,247 | 8/1966 | Knittel et al. | 297/DIG. 8 X |
| 3,883,176 | 5/1975 | Morton | 297/452.14 |
| 4,334,709 | 6/1982 | Akiyama et al. | 297/284.11 |
| 4,529,247 | 7/1985 | Stumpf et al. | 297/452.14 X |
| 4,629,253 | 12/1986 | Williams | 297/DIG. 8 X |
| 4,720,143 | 1/1988 | Schwartz et al. | 297/326 |
| 4,775,185 | 10/1988 | Scholin et al. | |
| 4,778,216 | 10/1988 | Stupakis | 297/DIG. 8 X |
| 5,076,646 | 12/1991 | Matte | 297/452.14 |
| 5,165,753 | 11/1992 | Henderson | 297/326 |
| 5,449,218 | 9/1995 | Beauvais et al. | 297/216.19 |
| 5,454,624 | 10/1995 | Anglade et al. | 297/321 X |
| 5,599,069 | 2/1997 | Lorbiecki | 297/452.15 |
| 5,641,201 | 6/1997 | Casey et al. | 297/326 |
| 5,772,281 | 6/1998 | Massara | 297/410 X |
| 5,803,542 | 9/1998 | Insausti | 297/425.14 X |

FOREIGN PATENT DOCUMENTS

| | | |
|---|---|---|
| 0 445 528 A2 | 9/1991 | European Pat. Off. . |
| 42 22 222 A1 | 1/1994 | Germany . |
| 217 733 | 6/1924 | United Kingdom . |

OTHER PUBLICATIONS

Patent abstracts of Japan vol. 013, No. 022 (M–786), Jan. 19, 1989 & JP 63 232046 A (Daihatsu Motor Co. Ltd.), Sep. 28, 1988, see abstract.

Patent abstracts of Japan vol. 095, No. 004, May 31, 1995 & JP 07 025274 A (Mazda Motor Corp.), Jan. 27, 1995, see abstract.

Primary Examiner—Peter M. Cuomo
Assistant Examiner—Stephen Vu
Attorney, Agent, or Firm—Brooks & Kushman P.C.

[57] ABSTRACT

A vehicle seat assembly includes a seat track member with a recliner pivot linkage pivotally connected thereto. A one-piece shell member is pivotally connected to the recliner pivot linkage and includes a back portion operative as a seat back frame and a lower seat support portion. At least one inflatable bladder supports the lower seat with respect to the lower seat support portion, and a linear actuator is positioned between the lower seat support portion and the seat track member for pivotally adjusting the shell member.

18 Claims, 1 Drawing Sheet

VEHICLE SEAT ASSEMBLY INCORPORATING A ONE-PIECE SHELL AS SEAT BACK AND LOWER SEAT SUPPORT

TECHNICAL FIELD

The present invention relates to a vehicle seat assembly incorporating a one-piece shell member including a back portion operative as a seat back frame and also including a lower seat support portion for support a lower seat.

BACKGROUND OF THE INVENTION

In recent years, vehicle seat design has made great advances in the areas of safety and universal adjustability. However, substantial added complexity, weight and cost have also resulted from these advancements.

Current vehicle seat designs typically incorporate a seat back frame, a lower seat frame, a seat back cushion assembly, a recliner mechanism, a plurality of electric motors for universal adjustability, and a variety of safety features. These assemblies typically also require a large rear trim component which may be a costly feature.

Accordingly, it is desirable to provide a vehicle seat design which is simplified by requiring fewer components without loss of universal adjustability or safety features, while reducing overall cost for the assembly.

DISCLOSURE OF THE INVENTION

The present invention overcomes the above-referenced shortcomings of prior art vehicle seat assemblies by providing a vehicle seat assembly which incorporates a one-piece shell member having a back portion operative as a seat back frame and a lower seat support portion for supporting a lower seat. An inflatable bladder supports the lower seat cushion with respect to the lower seat support portion, and the shell is adjustable by means of a pneumatic lift mechanism positioned between the lower seat support portion and a seat track member. In this configuration, the number of seat components is reduced, while reducing manufacturing costs and weight without loss of universal adjustability or safety features.

More specifically, the present invention provides a vehicle seat assembly including a seat track member and a recliner pivot linkage pivotally connected to the seat track member. A one-piece shell member is pivotally connected to the recliner pivot linkage and includes a back portion operative as a seat back frame and a lower seat support portion. A lower seat is adjustably supported with respect to the lower seat support portion.

In the preferred embodiment, at least one inflatable bladder supports the lower seat with respect to the lower seat support portion, and a pneumatic lift mechanism is positioned between the lower seat support portion and seat track member for pivotally adjusting the shell member.

Accordingly, an object of the present invention is to provide a simplified vehicle seat assembly design which reduces the number of components, and reduces design complexity and cost, while maintaining universal adjustability without loss of safety features.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
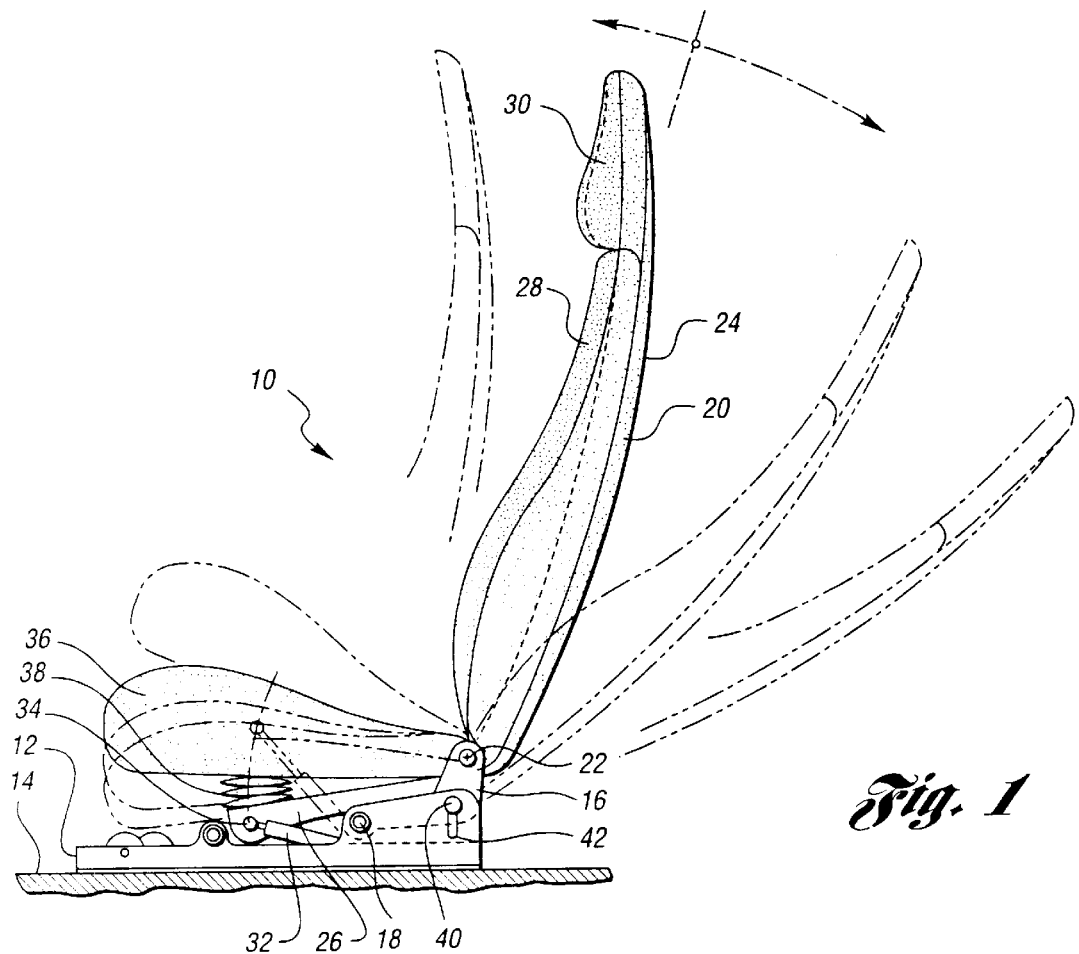
FIG. 1 shows a schematically arranged side view of a vehicle seat assembly in accordance with the present invention.
Figure 2:
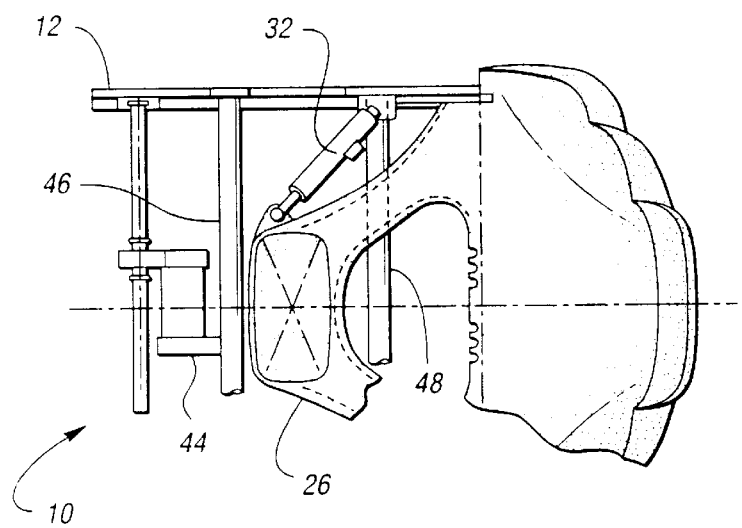
FIG. 2 shows a plan view of a seat track and shell member in accordance with the present invention.

Referring to FIGS. 1 and 2, a vehicle seat assembly 10 is shown in accordance with the present invention. The vehicle seat assembly includes a seat track member 12 which is movable on the vehicle floor 14. A recliner pivot linkage 16 is pivotally connected to the track member 12 at the pivot joint 18. A one-piece shell member 20 is pivotally connected to the recliner pivot linkage 16 at the pivot joint 22. The one-piece shell member 20 includes a back portion 24 operative as a seat back frame and a lower seat portion 26.

The one-piece shell member 20 may comprise a carbon fiber material, die cast magnesium, glass fiber, blow molded composite, etc. By using a composite material for the shell, the need for rear trim may be eliminated. The back portion 24 supports the seat back cushion 28 and head rest cushion 30.

The lower seat portion 26 of the shell 20 is adjustably supported with respect to the track member 12 by means of the pneumatic mechanism 32. The pneumatic mechanism 32 is connected to the distal end 34 of the lower seat portion 26 to provide mechanical advantage for adjustment of the shell member 20.

The lower seat 36 is adjustably supported with respect to the lower seat support portion 26 by means of the inflatable bladder 38. Accordingly, when the shell 20 has been pivotally adjusted by the pneumatic mechanism 32, the lower seat 36 may be properly adjusted by inflating or deflating the bladder 38.

The shell 20 is also vertically adjustable by means of the recliner pivot linkage 16. The recliner pivot linkage 16 includes a pin 40 which cooperates with the slot 42 formed in the track member 12 to facilitate the vertical adjustment of the shell member 20 by pivoting the recliner pivot linkage 16 about the pivot joint 18 such that the pin 40 slides within the slot 42.

As shown in FIG. 2, this design facilitates implementation of a single motor module 44. It also facilitates the use of support tubes 46,48 which may be extended in length to accommodate different seat sizes. This design also eliminates user unfriendly rotary recliner actuators, and provides a lighter structure due to mechanism and part reduction.

The recliner pivot linkage 16 may lend itself to a ride damping mechanism, and the pneumatic lift mechanism 32 provides a weight measurement opportunity for safety system customization.

In this configuration, if a "belt-in-seat" safety restraint system is used, the load passes directly through the seat tracks, and could easily include a low mount retractor for the belt to reduce the seat load carrying requirements.

While the best mode for carrying out the invention has been described in detail, those familiar with the art to which this invention relates will recognize various alternative designs and embodiments for practicing the invention within the scope of the appended claims.

What is claimed is:

1. A vehicle seat assembly comprising:

a scat track member;

a recliner pivot linkage pivotally connected to the seat track member;

a thin one-piece shell member pivotally connected to the recliner pivot linkage, wherein the one-piece shell member includes a back portion operative as a seat back frame for supporting a seat back cushion and a lower seat support portion extending from the back portion;

a lower seat adjustably supported by the lower seat support portion; and an actuator positioned between the lower seat support portion and the seat track member for pivotally adjusting the shell member for reclining the back portion in a rearward direction;

wherein the lower seat support portion extends underneath the lower seat for supporting the lower seat.

2. The vehicle seat assembly of claim 1, further comprising at least one inflatable bladder supporting the lower seat with respect to the lower seat support portion.

3. The vehicle seat assembly of claim 1, wherein the actuator comprises a pneumatic lift mechanism.

4. The vehicle seat assembly of claim 3, wherein the pneumatic lift mechanism is secured to the lower seat support portion at a distal end away from the pivotal connection between the shell member and the recliner pivot linkage to provide a mechanical advantage for lifting the lower seat support portion.

5. The vehicle seat assembly of claim 1, wherein the recliner pivot linkage is vertically adjustable with respect to the seat track member for vertical adjustment of the shell member.

6. The vehicle seat assembly of claim 5, wherein the recliner pivot linkage comprises a substantially L-shaped bracket pivotally connected at opposing ends to the seat track member and shell member, respectively, and includes a pin extending therefrom, and the seat track member includes a vertical slot formed therein for cooperation with the pin to facilitate the vertical adjustment of the shell member.

7. The vehicle seat assembly of claim 1, wherein the actuator comprises a linear actuator.

8. A vehicle seat assembly, comprising:

a seat track member;

a recliner pivot linkage pivotally connected to the seat track member;

a thin one-piece shell member pivotally connected to the recliner pivot linkage, the one-piece shell member including a back portion operative as a seat back frame for supporting a seat back cushion and a lower seat support portion extending from the back portion, wherein the back portion and the lower seat support portion are pivotable together in a rearward direction;

a lower seat adjustably supported with respect to the lower seat support portion; and at least one inflatable bladder supporting the lower seat with respect to the lower seat support portion;

wherein the lower seat support portion extends underneath the lower seat for supporting the lower seat.

9. The vehicle seat assembly of claim 8, further comprising a linear actuator positioned between the lower seat support portion and the seat track member for pivotally adjusting the shell member.

10. The vehicle seat assembly of claim 9, wherein the linear actuator is secured to the lower seat support portion at a distal end away from the pivotal connection between the shell member and the recliner pivot linkage to provide a mechanical advantage for lifting the lower seat support portion.

11. The vehicle seat assembly of claim 8, wherein the recliner pivot linkage is vertically adjustable with respect to the seat track member for vertical adjustment of the shell member.

12. The vehicle seat assembly of claim 11, wherein the recliner pivot linkage comprises a substantially L-shaped bracket pivotally connected at opposing ends to the seat track member and shell member, respectively, and includes a pin extending therefrom, and the seat track member includes a vertical slot formed therein for cooperation with the pin to facilitate the vertical adjustment of the shell member.

13. A vehicle seat assembly, comprising:

a seat track member;

a thin one-piece shell member pivotally connected with respect to the seat track member and vertically adjustable with respect to the seat track member, the one-piece shell member having a back portion operative as a seat back frame for supporting a seat back cushion and a lower seat support portion extending from the back portion, wherein the back portion and the lower seat support portion are pivotable together in a rearward direction;

a lower seat adjustably supported with respect to the lower seat support portion; and at least one inflatable bladder supporting the lower seat with respect to the lower seat support portion;

wherein the lower seat support portion extends underneath the lower seat for supporting the lower seat.

14. The vehicle seat assembly of claim 13 further comprising a linear actuator positioned between the lower seat support portion and the seat track member for pivotally adjusting the lower seat.

15. The vehicle seat assembly of claim 14, further comprising a recliner pivot linkage pivotally connecting the shell member to the seat track member.

16. The vehicle seat assembly of claim 15, wherein the recliner pivot linkage is vertically adjustable with respect to the seat track member for vertical adjustment of the shell member.

17. The vehicle seat assembly of claim 16, wherein the recliner pivot linkage comprises a substantially L-shaped bracket pivotally connected at opposing ends to the seat track member and shell member, respectively, and includes a pin extending therefrom, and the seat track member includes a vertical slot formed therein for cooperation with the pin to facilitate the vertical adjustment of the shell member.

18. The vehicle seat assembly of claim 17, wherein the linear actuator is secured to the lower seat support portion at a distal end away from the pivotal connection between the shell member and the recliner pivot linkage to provide a mechanical advantage for lifting the lower seat support portion.

* * * * *